US005694034A

United States Patent [19]

Dohnal et al.

[11] Patent Number: 5,694,034

[45] Date of Patent: Dec. 2, 1997

[54] TAP CHANGER FOR A TAPPED OR STEPPED TRANSFORMER

[75] Inventors: Dieter Dohnal, Lappersdorf; Hans-Henning Lessmann-Mieske, Neutraubling, both of Germany

[73] Assignee: Maschinenfabrik Reinhausen GmbH, Regensburg, Germany

[21] Appl. No.: 703,020

[22] Filed: Aug. 26, 1996

[30] Foreign Application Priority Data

Sep. 18, 1995 [DE] Germany ........................ 195 34 544.4

[51] Int. Cl.[6] ............................... G05B 24/02; G05F 1/16

[52] U.S. Cl. ...................... 323/340; 323/258; 200/11 TC

[58] Field of Search .................................... 323/258, 340, 323/341; 200/11 TC

[56] References Cited

U.S. PATENT DOCUMENTS

| | | | |
|---|---|---|---|
| 3,662,253 | 5/1972 | Yamamoto | 323/343 |
| 3,783,206 | 1/1974 | Lingenfelter | 200/11 TC |
| 5,488,212 | 1/1996 | Fukushi et al. | 200/400 |
| 5,594,223 | 1/1997 | Fukushi et al. | 200/11 TC |
| 5,604,423 | 2/1997 | Degeneff et al. | 323/258 |
| 5,604,424 | 2/1997 | Shuttleworth | 323/258 |

FOREIGN PATENT DOCUMENTS

| | | |
|---|---|---|
| 0 644 562 | 3/1995 | European Pat. Off. . |
| 95/27931 | 10/1995 | WIPO . |

*Primary Examiner*—Stuart N. Hecker
*Attorney, Agent, or Firm*—Herbert Dubno

[57] ABSTRACT

A tap changing circuit has each tap of a power transformer connected with a selector vacuum switching cell. The odd numbered cells and the even numbered cells are connected to respective sides of a load switch each including a further vacuum switching cell. The sides are bridged by a transition inductor or resistor.

3 Claims, 4 Drawing Sheets

FIG.1 PRIOR ART
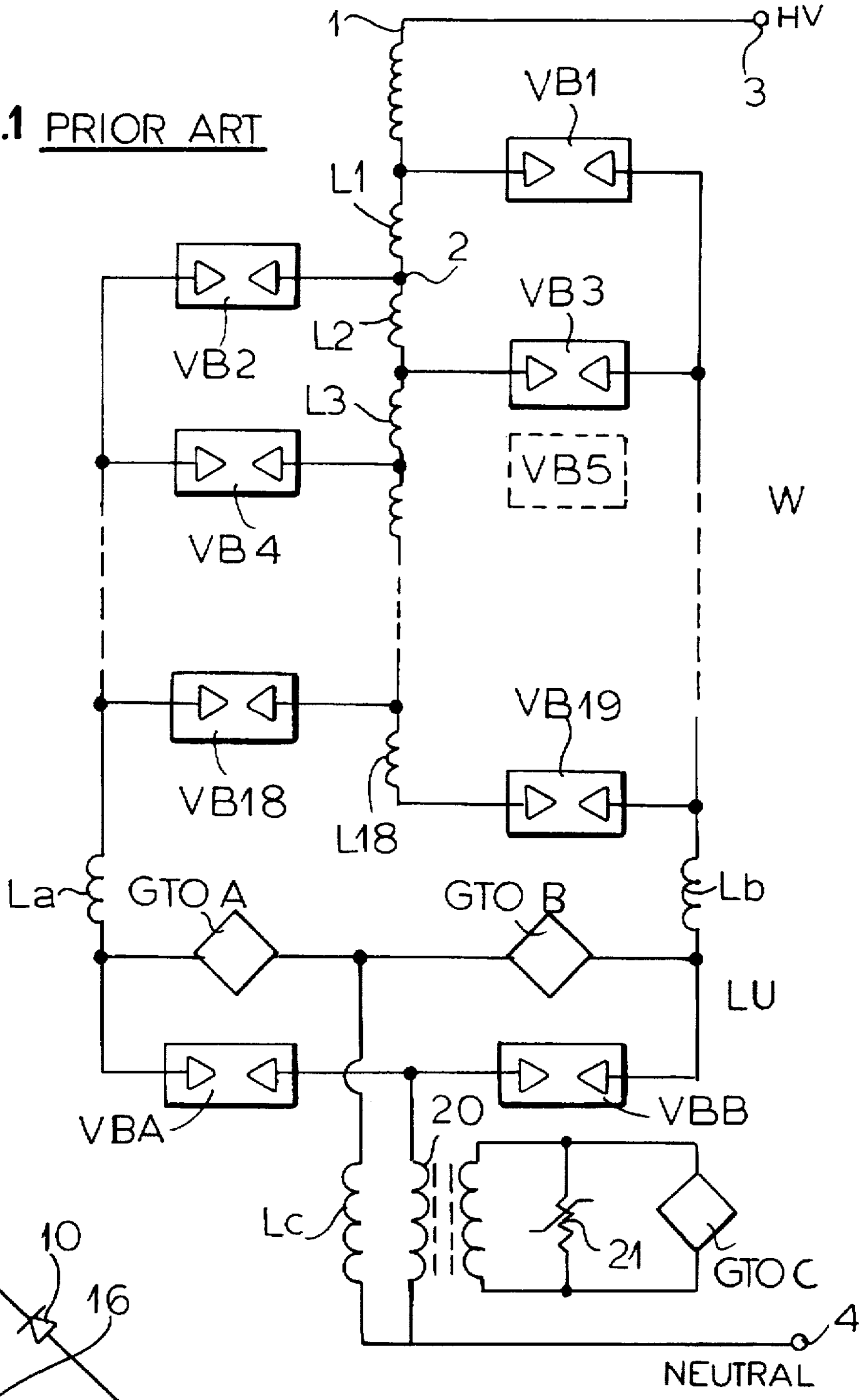
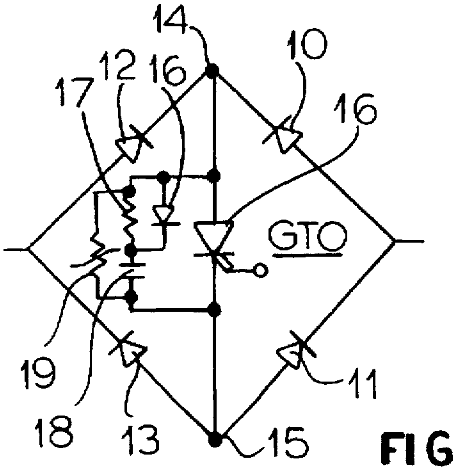
FIG.1a PRIOR ART

TAP CHANGER FOR A TAPPED OR STEPPED TRANSFORMER

SPECIFICATION

Field of the Invention

The present invention relates to a tap changer for the load switching of taps of a tapped transformer, especially for power applications.

Background of the Invention

As can be seen from European Patent Application 644,562, a load switching system for selecting taps of a tap transformer can comprise a tap selector and a load switch. The tap selector serves for selecting the tap which is to be effective and generally a multiplicity of such taps are provided, which can be referred to as even numbered taps and odd numbered taps, each of which can have a separate vacuum switching cell which can be connected to the load switch by conductors common to at least a number of such cells.

More particularly, the even numbered taps may have there vacuum switching cells connected to one side of the load switch while the odd numbered cells may have their vacuumed switching cells connected to the opposite side of the load switch.

The shifting from one tap to the next in either direction along the sequence of taps, therefore, involving switching between an odd numbered tap and its vacuum switching cell and successive even numbered tap and its vacuum switching cell or vice versa.

The load switch can comprise 3 GTO-bridges each of which may comprise a rectifier bridge across a diagonal of which is connected a thyrister whose anode/cathode path can be shunted by a network including a varistor. Two of these GTO-bridges are connected between the two sides of the load switch and the two sides of the load switch are connected in addition to a pair of further vacuum switching cells, a transformer winding being connected between these two latter vacuum switching cells and the neutral to which the junction between the previously mentioned GTO-bridges is connected. A further GTO-Bridge is connected across the secondary winding of this latter transformer.

In this tap changer, the winding vacuum switching cells are deenergized, i.e. do not conduct current, during the tap selection stage. Only upon completion of a tap selection does the switching circuitry for the load switch and hence for the GTO-bridges, place the newly selected winding tap and the corresponding vacuum switch cell under load. While the system has been found to be satisfactory for the tap selection process itself, it has the drawback that the switching circuitry is complex and expensive and requires maintenance and replacement from time to time, largely because it makes use of a number of thyrister, diodes and varistors.

OBJECTS OF THE INVENTION

It is, therefore, the principal object of the present invention to provide an improved load switching system using vacuum switching cells whereby drawbacks of this earlier system can be avoided. More particularly, it is an object of the invention to provide a tap changer for a stepped transformer which eliminates the need for complex circuitry involving thyristers, diodes and varistors and which nevertheless permits rapid tap change operations under load.

Another object of the invention is to provide an improved tap changer system of the type described in which the construction of the tap selection system is maintained but the load switch is greatly simplified.

SUMMARY OF THE INVENTION

These objects and others which will become apparent hereinafter are attained, in accordance with the invention by providing the load switching so that each side thereof, connected to either the vacuum switching cells of the even numbered taps or the vacuum switching cells of the odd numbered taps, is bridged by a transition choke or inductor (hereinafter referred to as a reactance or reactive impedance as well), thereby eliminating the need for GTO-bridges and the components thereof.

A further advantage of the invention is that the vacuum switching cells can be switched under load, i.e. with arcs which serve to condition the vacuum switching cells. The result is an improvement of the voltage surge capacity in the open circuit state.

A tap changer in accordance with the invention can thus comprise:

- a tap selector for a tap-changing transformer having a multiplicity of winding taps, the tap selector including a respective tap-selection vacuum switching cell connected to each of the taps;
- a load switch having first and second sides respectively including a first and a second load-switching vacuum switching cells connected to a neutral conductor of the tap-changing transformer;
- means electrically connecting all of the tap-selection vacuum switching cells of even-numbered ones of the taps to the first load-switching vacuum switching cell of the first side of the load switch;
- means electrically connecting all of the tap-selection vacuum switching cells of odd-numbered ones of the taps to the second load-switching vacuum switching cell of the second side of the load switch; and
- a transition impedance element selected from at least one of a reactive impedance and a resistive impedance bridged across the first and second sides between the tap-selection vacuum switching cells and the load-switching vacuum switching cells.

If the thermal conditions are not critical, instead of a transition reactance, a transition resistor can be used.

The vacuum switching cells may be vacuum circuit breakers a described in EP 0,644,562 A1 which describes them as in article "Load Tap Changing with Vacuum Interrupters", IEEE Transactions on Power Apparatus and Systems, volume PAS AES, No. 4, Apr., 1967. These vacuum breakers can be of the type V504E manufactured by Vacuum Interrupters Limited of London, England.

In general, each such vacuum breaker has contacts sealed in an evacuated enclosure. During contact separation, a plasma created by the vaporization of the contact material provides a path for continuation of current flow. The charge carriers making up the plasma disperse rapidly in the high vacuum and recombine on the metal surfaces of the contacts. The metal ions leaving the vacuum arc in this way are continuously replaced by new charge carriers generated by the vaporization of current-carrying material. At zero current the generation of charge carriers stops but their recombination continues to deionize the contact zone and break electrical flow through the vacuum circuit breaker. The only moving part is a single movable contact and when reference herein is made to rendering the vacuum switching cell conductive, we intend to refer to such movement of the contact to render the device conductive. Reference may also be made to U.S. Pat. No. 5,408,171 and WO 95/27931.

BRIEF DESCRIPTION OF THE DRAWING

The above and other objects, features, and advantages will become more readily apparent from the following description, reference being made to the accompanying drawing in which:

FIG. 1 is a diagram of the prior art configuration of a tap change;

FIG. 1a is a diagram of the GTO-bridge circuit thereof;

SPECIFIC DESCRIPTION

Figure 2:
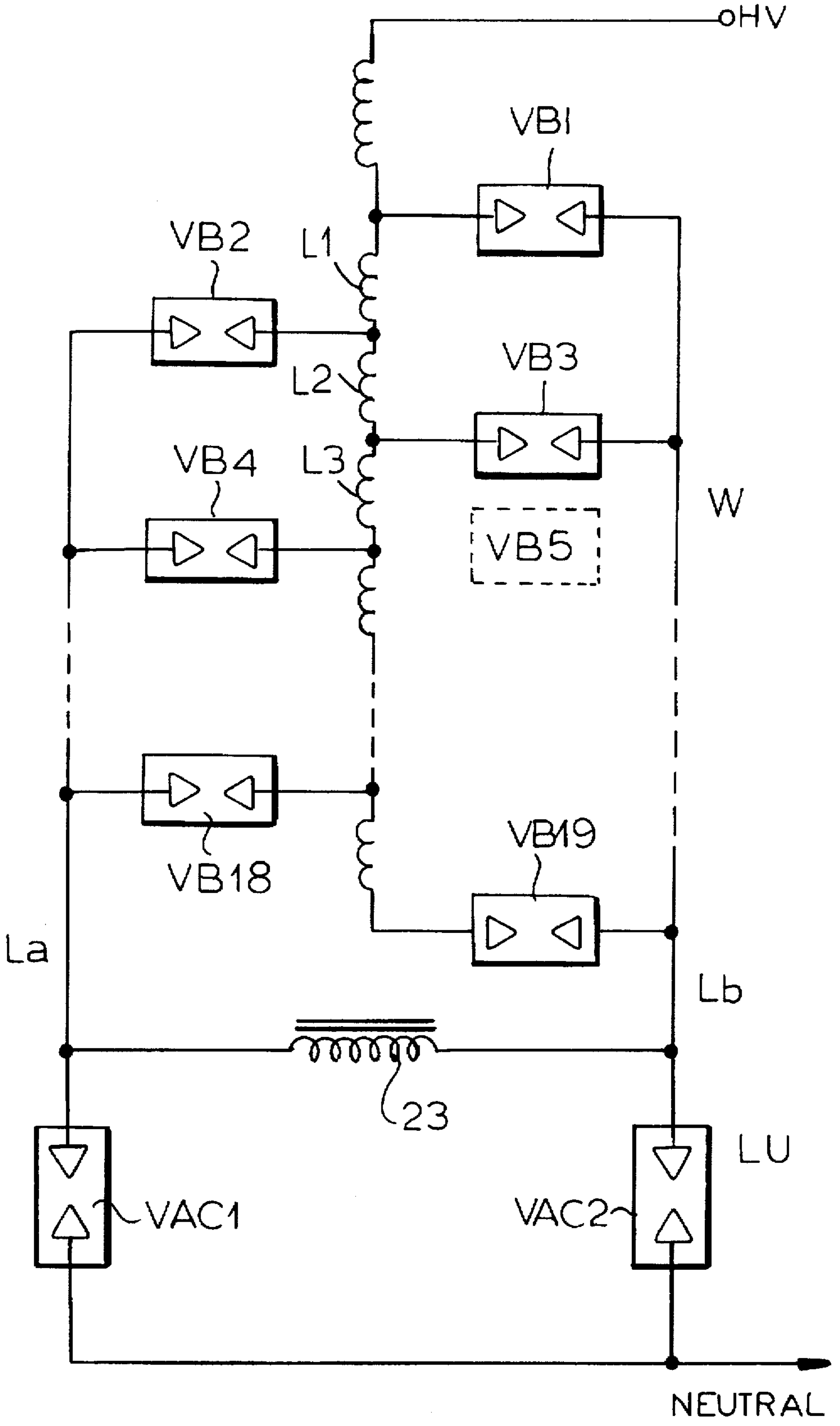
FIG. 2 is a circuit diagram of the tap changer of the invention;.

To clarify what has been said earlier with respect to the prior art, it can be seen from FIGS. 1 and 1a that a tapped transformed winding 1 having taps 2 between winding sections L1 . . . L18, can have its high voltage output terminal 3 and its neutral 4 as is standard and can have a tap changer consisting of a tap selector portion W and a load switch Lu.

The tap selector W comprises respective vacuum switching cells VB1 . . . VB19, connected to respective taps 2 of the winding 1 such that one side La of the load switch Lu is connected to all of the vacuum switching cells VB2, VB4 . . . VB18 for the even numbered taps while the opposite side LB of the load switch Lu is connected to all of the vacuum switching cells VB1, VB3 . . . VB19 of the odd numbered taps. The load switch itself comprises GTO-bridges including GTO-bridges GTO-A and GTO-B connected across the load switch, a connection between these bridges being effected via a winding of a transformer LC to the neutral 4.

Also connected across the sides La and Lb of the load switch Lu are two vacuum switching cells VBA and VBB which are connected via a transformer winding 20 to the neutral 4. The third GTO-bridge GTO-C is connected to the secondary winding which is bridged by a varister 21.

Each of the GTO's has, as can be seen from FIG. 1a, four rectifier diodes 10, 11, 12, 13 in a bridge configuration across one diagonal 14, 15 of which a thyristor 16 is connected. The gate of that thyristor is connected to a conventional triggering circuit not shown. Bridged across the anode and cathode or power terminals of the thyristor is an RC time-constant network formed by a resistor 17 and a capacitor 18, the resistor 17 being bridged by a diode 16. A varistor 19 is connected across the time constant network 17, 18. With this system, operating as described in the European patent previously mentioned, switching of the vacuum switching cells VB1 . . . VB19 is not effected under load and the components of the load switch are expensive and the control circuitry is complex.

Such complexity can be avoided by the circuit shown in FIG. 2 in which parts analogous to those of FIG. 1 have been identified with corresponding reference characters. Here again, the 19 taps are each provided with a vacuum switching cell VB1 . . . VB19. The vacuum switching cells VB2, VB4 . . . VB18 of the even numbered taps are connected to a first branch La of the load switch Lu while the odd numbered taps have there vacuum switching cells VB1, VB3 . . . VB19 connected to the second branch Lb of the load switch.

Each of these branches of the load switch has a respective further vacuum switching cell VAC1, VAC2, whose opposite side is connected to the neutral load line of the transformer. Bridged across the two vacuum switching cells VAC1, VAC2 on the side opposite the neutral line, is a transition reactance in the form of a choke 23.

Figure 3:
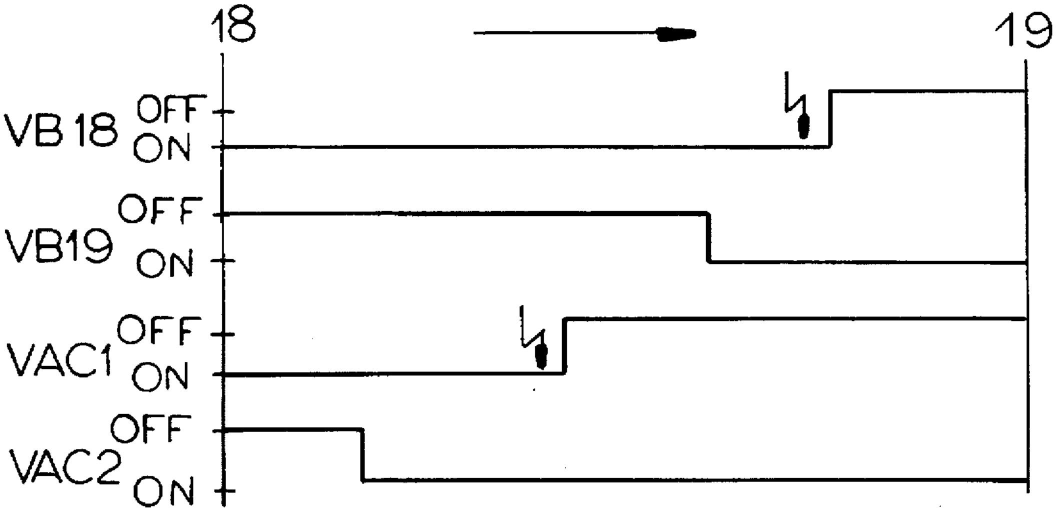
FIG. 3 is a timing diagram showing the switching sequence for a tap change from tap number 18 to tap number 19 of the nineteen tap transformer.
Figure 4:
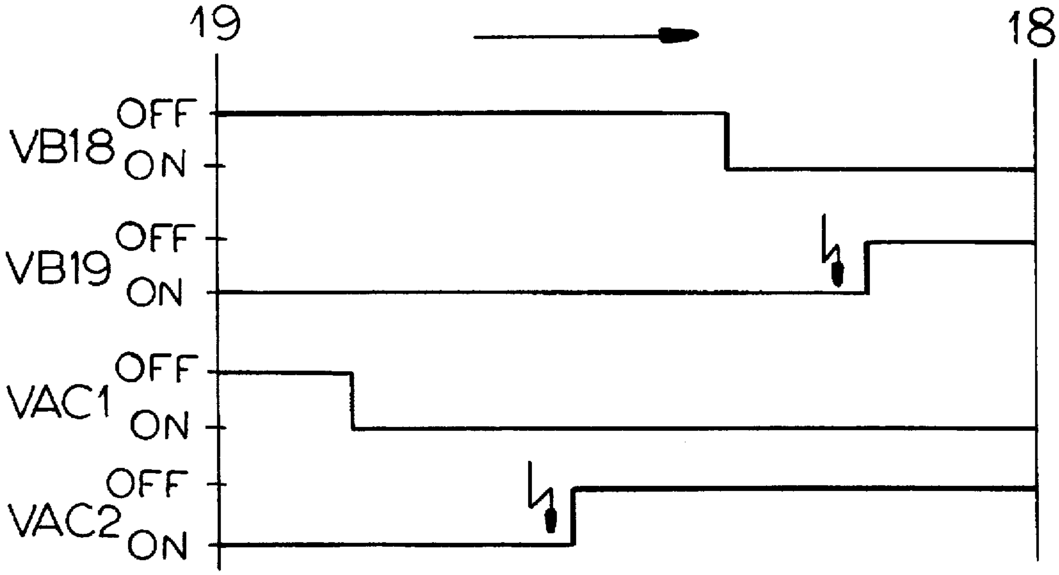
FIG. 4 is a timing sequence diagram showing the tap change from tap 19 back to tap 18.

FIG. 3 shows the switching sequence for a tap change from tap 18 to tap 19. As a first step, the vacuum switching cell VAC2 is closed and thereupon the vacuum switching cells VAC1 is open. The vacuum switching cell VB19 is closed and vacuum switching cell VB18 is opened to effect the tap change under load. The result is an arc development in the vacuum switching cells which are switched. FIG. 4 shows a reverse switching from tap 18 to tap 19 in which the sequence is reversed.

Figure 5:
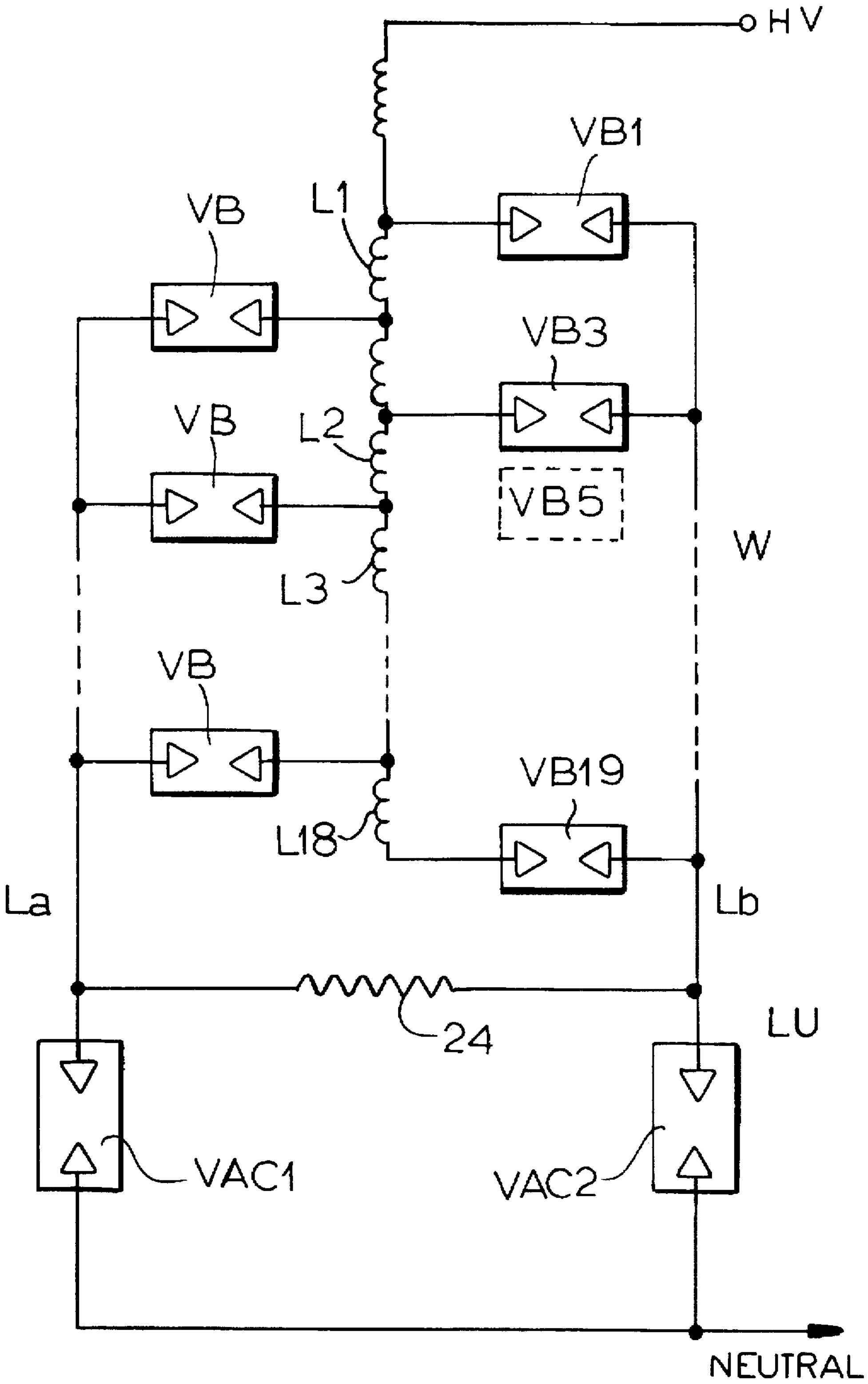
FIG. 5 is a view similar to FIG. 2 showing another embodiment of the invention.

It will be apparent from this switching sequence that tap selection and load switching are combined in a common switching process. While the prior art tap selector first effects a tap change and only carries out load switching in the load switch when the tap change is completed, the tap change and load switching with the invention are combined and are inseparable in time. Each switching process begins with the selection of the tap and thus of the vacuum switching cell thereof and concurrently with switchover of one of the two vacuum switching cells of the load switch and the switching process is completed by the open circuit of one of the vacuum switching cells in the tap selector section. With the invention, therefore, the vacuum switching cells VB1 . . . VB19 of the selector have a dual function since they serve both for tap selection and as components of the load switching system. With the system of the invention, the good electrical characters of the selector vacuum shifting cells VB1 . . . VB19 are also utilized in the load switching process. The transition reactants replaces the expensive electronic circuitry hitherto required and the system of the invention can avoid the drawback that GTO's have only a limited power range. The losses in the system of the invention are reduced in that the third GTO, GTO-C as illustrated in FIG. 1, which is transversed by current constantly, thereby leading the such losses is eliminated with the system of the invention. An effect similar to that obtained with the system of FIG. 2 can be obtained with the system of FIG. 5 in which the transition choke 23 is replaced by a transition resistor 24. This circuit can be used wherever thermal conditions permit since there is a development of heat in the resistor 24.

We claim:

1. A tap changer for a tap-changing transformer, comprising:

a tap selector for a tap-changing transformer having a multiplicity of winding taps, said tap selector including a respective tap-selection vacuum switching cell connected to each of said taps;

a load switch having first and second sides respectively including a first and a second load-switching vacuum switching cells connected to a neutral conductor of said tap-changing transformer;

means electrically connecting all of the tap-selection vacuum switching cells of even-numbered ones of said taps to the first load-switching vacuum switching cell of said first side of said load switch;

means electrically connecting all of the tap-selection vacuum switching cells of odd-numbered ones of said taps to the second load-switching vacuum switching cell of said second side of said load switch; and a transition impedance element selected from at least one of a reactive impedance and a resistive impedance bridged across said first and second sides between said tap-selection vacuum switching cells and said load-switching vacuum switching cells.

2. The tap changer defined in claim 1 wherein said impedance element is a transition reactance.

3. The tap changer defined in claim 1 wherein said impedance element is a transition resistance.

* * * * *